United States Patent [19]

United States Patent [19]

Doi et al.

[11] Patent Number: 4,904,152
[45] Date of Patent: Feb. 27, 1990

[54] INDUSTRIAL ROBOT

[75] Inventors: Makoto Doi; Akiyoshi Nakada, both of Osaka; Toshitsugu Inoue, Kyoto; Mikio Hasegawa, Osaka; Kenji Sogawa, Osaka; Toshihiro Ide, Osaka, all of Japan

[73] Assignee: Matsushita Electric Industrial Co., Ltd., Japan

[21] Appl. No.: 315,253

[22] Filed: Feb. 23, 1989

Related U.S. Application Data

[63] Continuation of Ser. No. 46,917, filed as PCT JP86/00363 on Jul. 16, 1986, published as WO87/00478 on Jan. 29, 1987, abandoned.

[30] Foreign Application Priority Data

Jul. 26, 1985 [JP] Japan .............................. 60-165133

[51] Int. Cl.⁴ .............................................. B66C 1/10
[52] U.S. Cl. ................................ 414/730; 318/594; 318/616; 318/568.11; 901/9; 414/917

[56] References Cited

U.S. PATENT DOCUMENTS

| | | | |
|---|---|---|---|
| 4,002,958 | 1/1977 | Akamatsu | 901/9 X |
| 4,200,827 | 4/1980 | Oswald | 318/594 X |
| 4,314,185 | 2/1982 | Schneider et al. | 318/590 X |
| 4,341,986 | 7/1982 | Browder | 318/618 |
| 4,345,194 | 8/1982 | Green | 318/618 X |
| 4,367,998 | 1/1983 | Causer | 414/917 X |
| 4,374,349 | 2/1983 | Inaba et al. | 901/9 X |
| 4,458,188 | 7/1984 | Inaba et al. | 318/590 X |
| 4,574,227 | 3/1986 | Herder et al. | 318/561 X |
| 4,603,284 | 7/1986 | Perzley | 901/45 X |
| 4,640,663 | 2/1987 | Niinomi et al. | 414/730 |
| 4,710,865 | 1/1987 | Higomura | 318/594 X |
| 4,714,400 | 12/1987 | Barnett et al. | 901/9 X |

FOREIGN PATENT DOCUMENTS

| | | | |
|---|---|---|---|
| 2832985 | 3/1980 | Fed. Rep. of Germany | 414/917 |
| 52-88964 | 7/1977 | Japan . | |
| 56-69092 | 6/1981 | Japan . | |
| 59-200304 | 11/1984 | Japan . | |
| 5306 | 1/1985 | Japan | 318/616 |
| 8303209 | 4/1985 | Netherlands | 414/917 |
| 798713 | 1/1981 | U.S.S.R. | 414/730 |
| 1202860 | 1/1986 | U.S.S.R. | 414/917 |
| 2095644 | 10/1982 | United Kingdom | 901/9 |

*Primary Examiner*—Robert J. Spar
*Assistant Examiner*—William M. Hienz
*Attorney, Agent, or Firm*—Lowe, Price, LeBlanc, Becker & Shur

[57] ABSTRACT

In an industrial robot including a control apparatus capable of executing control of the robot in a position control mode, a velocity control mode and a current control mode. The control apparatus includes a changeover section (20) for executing changeover between the position control mode and the current control mode. The position of an object is sensed by driving a set of arms of the robot in a force control mode which is a combination of the velocity control mode and the current control mode, and detecting the position at which the arms contact an object and are halted. Detection of the halted condition is performed based on a condition of an output signal produced from a position sensor (13), and by repetitively performing such detection for a plurality of different points on the body surface, a plurality of position values are derived which are compared with reference position data. Any change of the position of the object from a reference position is thereby computed by a computation section (24), whereby the robot itself is capable of sensing the position or attitude of an object, in 2 dimensions or 3 dimensions.

5 Claims, 3 Drawing Sheets

INDUSTRIAL ROBOT

This is a continuation of application Ser. No. 046,917, filed as PCT JP86/00363 on Jul. 16, 1986, published as WO87/00478 on Jan 29, 1987, now abandoned.

FIELD OF TECHNOLOGY

The present invention relates to an industrial robot which is in itself capable of sensing the position of an object.

BACKGROUND TECHNOLOGY

In the application of industrial robots, cases arise in which positioning of an object by repetitive positioning operations in accordance with an instruction position may be unsatisfactory. This can be due to various reasons, e.g. because a sufficiently high degree of positioning accuracy cannot be obtained, because the relative positions of the robot and the object may vary, because the size of the object may vary, or because the execution of such positioning or apparatus required to perform the positioning results in excessively high cost. There is therefore a strong requirement for sensing the position of the object, and performing correction of the robot position with respect to the instruction position based on the results of this sensing.

Among the methods which have been proposed to achieve this are for example the use of an optical recognition apparatus or use of an ultrasonic wave detection apparatus for sensing the object position, with the data representing the results of this sensing being transferred to the robot and the robot then executing positioning correction on the basis of this data. However such methods present the disadvantage of requiring the use of a dedicated optical recognition apparatus, or ultrasonic wave detection apparatus for each robot. This is undesirable from the aspect of cost. In addition, such methods are disadvantageous because of problems which they present with regard to position sensing in three dimensions.

SUMMARY OF THE INVENTION

It is a primary objective of the present invention to provide an industrial robot which is in itself capable of sensing the position of an object, without the necessity for utilizing an optical recognition apparatus or ultrasonic wave detection apparatus, etc.

It is a further objective of the present invention to provide an industrial robot which is in itself capable of sensing the position of an object and the position of a working point, both for the case in which positional deviations of the object occur in two dimensions and in which such deviations occur in three dimensions, and for cases in which it is not possible to directly sense the working point.

To attain the objectives described above, an industrial robot according to the present invention comprises an arm section having a plurality of degrees of freedom, a plurality of drive means for driving the arm section, at least one position sensor for sensing an amount of displacement of said arm section, and a control apparatus for controlling movement of the arms, with the control apparatus being capable of executing control in a position control mode, a velocity control mode and a current control mode respectively. The control apparatus further comprises changeover means for executing changeover between the current control mode and the position control mode, and sensing means for sensing halting of the arm section, based upon a change in an output value produced from the position sensor.

An industrial robot according to the present invention further comprises computation means for computing the position or attitude of an object, by comparing a reference value with an output value which is produced from the position sensor when it is detected by the sensing means that the arm section has halted.

In addition, an industrial robot according to the present invention for readily achieving the above objectives preferably comprises four arms constituting the arm section, the arms consisting of a first and a second arm which are disposed mutually parallel and second arm and a fourth arm which are disposed mutually parallel, with the arms being arranged in a pantograph configuration, a pivot being provided at one end of the first arm, and a pivot also provided at one end of the fourth arm, these pivots and the free end of the second arm being arranged along a common straight line. And with the drive section comprising first and second linear motors which are respectively capable of producing movement in the vertical and the horizontal directions and a third linear motor which is coupled to the pivot of the fourth arm and is movable in a direction at right angles to the directions of movement of the first and second linear motors.

DESCRIPTION OF THE PREFERRED EMBODIMENTS

Figure 1:
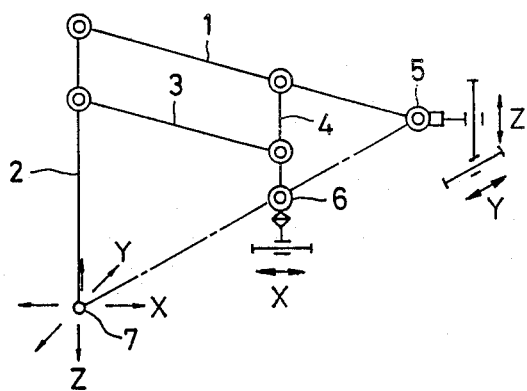
FIG. 1 is a line diagram of an embodiment of an industrial robot according to the present invention.

FIG. 1 is a line diagram of an embodiment of an industrial robot according to the present invention, in which a set of arms designated by numerals 1, 2, 3 and 4 respectively are mutually rotatably coupled at respective points of intersection, with arms 1 and 3 being disposed mutually parallel and with arms 2 and 4 also being disposed mutually parallel, with the arms being arranged to form a parallelogram. Pivots 5 and 6 each permit rotational movement about the Z axis and an axis perpendicular thereto. The free end 7 of arm 2 and the pivots 5 and 6 are respectively arranged along a common straight line. With such a configuration, when pivot 6 is moved in the X-direction, and fulcrum 5 is moved in the Y or the Z direction, then arm end 7 is also moved in the X, Y or Z direction. If pivot 6 is moved linearly along the X-direction, then arm end 7 will also be moved linearly in the X-direction, by an amount which is a fixed proportion of the amount of movement of pivot 6, with this fixed proportion being determined by the respective lengths of the arms. If pivot 5 is moved linearly in the Y-direction, then arm end 7 will also move linearly in the Y-direction, while if pivot 5 is moved in the Z-direction then arm end 7 will similarly move in the Z-direction, with the amount of movement of arm 7 in each case being a fixed proportion of the amount of movement of pivot 5. In this way, arm end 7 is moved in mutually perpendicular coordinates which are identical to the coordinates in which the drive system moves, with a fixed ratio established between movement of the drive system and resultant movement of arm end 7.

Figure 2:
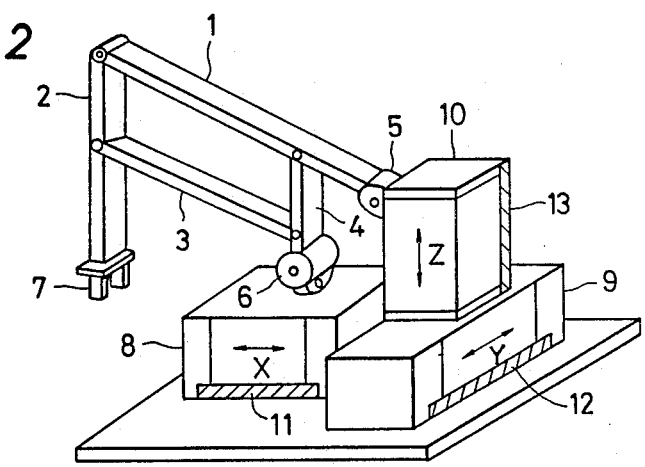
FIG. 2 is an oblique view of the embodiment of FIG. 1.

FIG. 2 is an oblique view of a specific configuration for an industrial robot in accordance with the line diagram of FIG. 1. In FIG. 2, nums 8, 9 and 10 denote respective linear servo motors, 11, 12 and 13 denote sensors (linear encoders) for sensing the positions of linear motors 8, 9 and 10 respectively. The linear motors 8, 9 and 10 respectively produce movement of pivot 6 in the X-direction and pivot 5 in the Y and Z-directions. Each of the linear motors 8 to 10 is of voice-coil type, with the relationship between motor drive current i (A) and output force F (kgt) being as follows:

$F = k.i$ (where k is a constant of proportionality)

Thus, the level of output force produced by the motor can be controlled by control of the level of drive current supplied to the motor.

Figure 3:
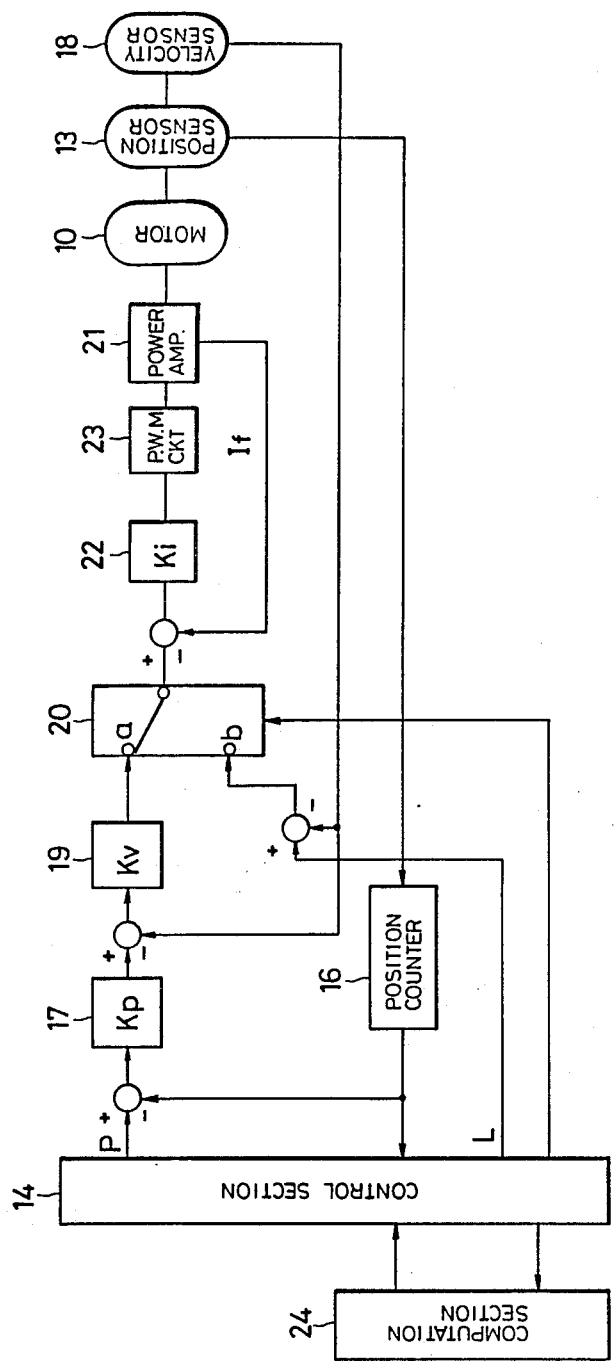
FIG. 3 is a block diagram of a control apparatus of the embodiment.

FIG. 3 is a block diagram showing the configuration of a portion of a control apparatus for the industrial robot of FIG. 2, specifically, showing a portion which executes control of a specific one of motors 8 to 10. In FIG. 3, numeral 14 denotes a control section for controlling motor 10, numeral 17 denotes a position amplifier for deriving and amplifying the difference between the contents of a position command signal P (produced from control section 14) and a position value which is produced by a position counter 16 based on a position sensing quantity which is derived by position sensor 13. Numeral 19 denotes a velocity amplifier, for deriving and amplifying the difference between an output produced from the position amplifier 17 and a velocity sensing quantity which is produced from a velocity sensor 18. Numeral 20 denotes a changeover section, for selectively transferring to an output terminal thereof the output from velocity amplifier 19 or a signal which is the difference between the sensing output quantity from velocity sensor 18 and a force command value L which is produced from the control section 14, with changeover between these two states of changeover section 20 being executed under the control of a changeover signal produced from the control section 14. Numeral 22 denotes a current amplifier, for deriving and amplifying the difference between the output from changeover section 20 and a current sensing value $I_f$ which is produced from a power amplifier 21. Numeral 23 denotes a pulse-width modulator (hereinafter abbreviated to PWM) circuit, which performs pulse-width modulation of the output from the current amplifier 22. Numeral 24 denotes a computation section, which executes read-in of output values produced from the position sensor 13 and the position counter 16, transferred through the control section 14, and stores these values, and which performs computations on a plurality of such stored values in accordance with previously assigned equations, with the results of these computations being supplied to the control section 14.

When the changeover section 20 is in the "a" switching position shown in FIG. 3, the apparatus operates in a position control mode, in which positioning is performed by position feedback, velocity feedback, and current feedback in response to the command P produced from the control section 14. In this case, motor 10 is controlled by the output from the PWM circuit 23, applied through the power amplifier 21, to execute driving (i.e. of the end 7 of arm 2 shown in FIG. 2) to a position which matches a position command value P. When the changeover section 20 is in the "b" switching position, the apparatus operates in a force control mode, in which the difference between the force command value L and the velocity feedback from the velocity sensor 18 is derived, and the difference between the result of this and the current feedback value $I_f$ from the power amplifier 21 is derived and applied through the current amplifier 22, the PWM circuit 23 and the power amplifier 21 to drive the motor 10. During operation in this mode, so long as the arm end 7 does not move into contact with the object whose position is being sensed, the arms are moved at constant velocity as a result of the velocity feedback which is applied to control driving of motor 10. When the arm end 7 comes into contact with the object, then the velocity of the arms will be brought to zero, so that the drive current which is supplied to motor 10 will then be determined by current feedback, at a level which is determined only by the force command value L.

If motor 10 is a servomotor, then the motor load current and output force (i.e. rotary torque or linear force) will be mutually proportional, so that a fixed amount of output force can be produced during operation in the force control mode. In this mode, the position of the moving portion of motor 10 (referred to hereinafter simply as the position of motor 10) is read into the computation section 24 through the operation of the position sensor 13 and the position counter 16. By suitably determining beforehand the degree of force which can be exerted by the arms, when the arm end 7 comes into contact with the object, halting of movement of the arms resulting from this contact can be detected without any change in the position of the object being produced. By then executing read-in of the position of the arm end 7 at that time, a position of a point on the object along one of the X, Y or Z axes can be measured.

With the industrial robot of FIG. 2, positioning of the arm end 7 is first executed by operation of linear motors 8, 9 and 10 in the position control mode, i.e. with changeover section 20 set to the "a" position by the changeover control signal S from the control section 14 until the arm end 7 is brought to a predetermined position near the object whose position is to be sensed. The positions attained along two out of the three directions of movement (the X, Y and Z axes) are then held fixed, and force control mode operation is entered to execute movement of the arm end 7 in the remaining direction, e.g. force control mode operation may be applied to drive motor 9. The arm end 7 is then moved at constant velocity in the Y direction, and movement halts when the arm end 7 comes into contact with the object whose position is being sensed. The position along the Y-axis at which this contact occurs is sensed by the Y-direction position sensor 12. The above operations can then be repeated for the X and Z directions.

Figure 4:
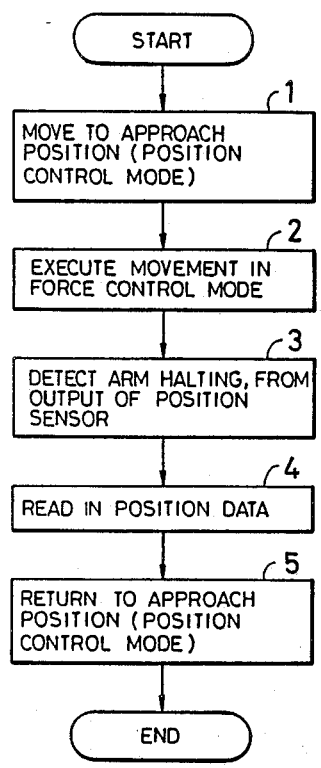
FIG. 4 is a flow chart of an operating sequence for 1-point measurement.

FIG. 4 is a flow chart for illustrating the operating sequence for one-point position measurement, i.e. for measurement of the position of one point on an object, along one of the X, Y or Z directions. First, the arm end 7 is moved to the vicinity of an approach point in the position control mode, in accordance with previously determined instructions (step 1). The approach point is located close to the object whose position is to be measured. Next the arm end 7 is moved closer to the object than the approach point, along one of the X, Y or Z axes, in the force control mode, (step 2) until arm end 7 comes into contact with the object. This operation in the force control mode is executed based on a force command value L as described above. The value of L is established beforehand, such that the arm end 7 cannot exert a sufficient force on the object being sensed to produce movement or deformation of the object. Contact between the arm end 7 and the object is detected (step 3) based on the fact that the output from velocity sensor 18 will cease to vary when contact occurs (i.e. since movement of the arm end 7 is of course halted). After read-in to computation section 24 of the contents of position counter 16 at that time, as a measurement data value, changeover is executed to the position control mode and the arm end 7 is returned to the approach point (step 5). In this way, position measurement is executed by utilizing the force control mode.

Figure 5:
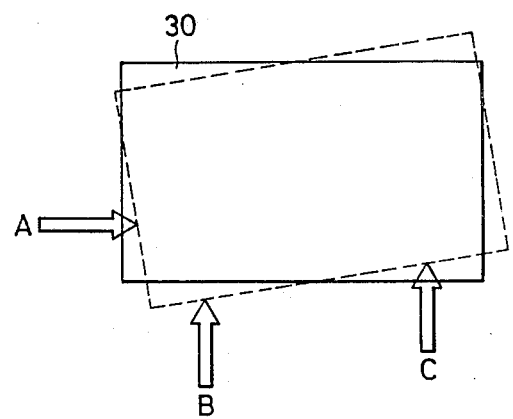
FIG. 5 is a diagram for assistance in describing measurement of plane positions in 2 dimensions.
Figure 6:
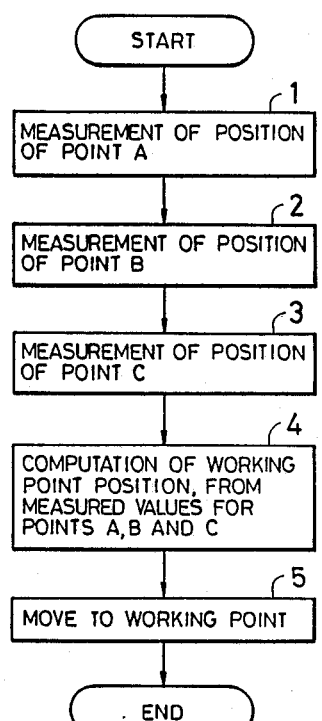
FIG. 6 is a flow chart of an operating sequence for executing the measurement shown in FIG. 5.

FIGS. 5 and 6 illustrate an example of position measurement in 2 dimensions. In FIG. 5, the full-line outline indicates reference positions of faces of an object 30, while the broken-line outline shows the actual positions of these faces. Measurement is performed along the directions of arrows A, B and C respectively, by deriving the differences between respective measured position values and reference position values. The positions and inclinations of the faces of object 30 can thereby be obtained, and in addition the position of a working point on the faces can also be obtained. The procedure for accomplishing this is illustrated in steps 1 to 5 of FIG. 6. With this operating sequence, the positions and inclinations of the faces of the object, and the position of a working point on the faces, can be obtained by utilizing measurement data, representing the positions of respective points on the faces of object 30, in previously established computation equations, which are processed by computation section 24 shown in FIG. 3.

In the embodiment of the present invention described above, force control is executed by a combination of a velocity control mode and a current control mode. During force control mode operation, judgement is performed as to whether or not movement of the arms has halted, and the position at which this movement halts is detected and is read into the computation section. These operations are repetitively executed for a plurality of points on the surface of the object. The data thus derived is compared with reference position data, and the computation section executes computations to obtain amounts of change of the object position and change in attitude of the object, relative to a reference position. In this way, the robot itself performs sensing of position and attitude, in 2 dimensions or in 3 dimensions.

The embodiment of the present invention described in the above employs linear motors to drive a set of arms which are arranged in a pantograph configuration. With such a configuration, an arm end of the robot is movable in mutually perpendicular directions by driving executed by the linear motors, with the movement of the arm end being fixedly proportional to linear motor drive movement. Thus, during force control operation, the direction of movement of the arm end and the degree of force exerted by the arm end are both constant. However it would be equally possible to utilize rotary types of motor for position measurement using force control operation, so that the present invention is not limited to the arrangement of arms which is utilized in the described embodiment.

Furthermore, various configurations can be employed for the joints of the robot. However direct motor drive operation applied to the joints is preferable, rather than motor drive which is applied through a speed reduction mechanism coupled between the motors and the robot joints. This is due to the fact that direct motor drive operation results in lower friction, thereby enhancing the accuracy of force control operation, and reduces looseness and bending of the arms, thereby enhancing the accuracy of position sensing.

The above embodiment has been described for the case of position measurement of faces of an object in 2 dimensions. However the invention is of course equally applicable to position measurement in 3 dimensions, by increasing the number of measurement points. The computations which are executed by the computation section must be related to the measurement points in a predetermined manner, such as to match the specific object which is to be subjected to position measurement.

POSSIBILITIES OF INDUSTRIAL UTILIZATION

An industrial robot according to the present invention, as described hereinabove, employs force control operation based on a combination of a velocity control mode and a current control mode to drive an arm section. When the arm section comes into contact with an object, this is detected and a position of the arm section at that time is read into a computation section from a position sensor. Position values for a plurality of positions are read in this way, whereby the position and attitude of the object can be obtained. Thus, the robot is in itself capable of sensing the position and attitude of an object, in 2 dimensions or 3 dimensions, without the necessity for utilizing an optical recognition apparatus or ultrasonic wave detection apparatus, etc. The present invention is therefore extremely practicable and valuable.

What is claimed is:

1. An industrial robot including an arm mechanism for producing movement of an operating member in a plurality of mutually perpendicular directions, drive means for driving said arm mechanism for movement of said operating member in respective ones of said directions, position sensing means for sensing amounts of displacement of said operating member, and a control apparatus for controlling said drive means to move said operating member, and characterized in that said control apparatus includes changeover means operable for selectively establishing a position control mode and a force control mode for controlling movement of said operating member, and in that during operation in said position control mode said operating member is driven to a predetermined position corresponding to a position control signal produced by said control apparatus, while during operation in said force control mode said operating member is driven from said predetermined position in a fixed direction until said control apparatus detects a cessation of movement of said operating member resulting from contact with a workpiece, said cessation of movement being detected by said control apparatus as a cessation of change in an output signal from said position sensing means, with a predetermined level of drive current supplied to said drive means following said cessation of movement, said current level being determined by a force control signal, wherein said drive means comprises a plurality of drive sections for driving said operating member in respective ones of said mutually perpendicular directions, and further comprising velocity sensing means for sensing a velocity of said operating member and current sensing means for sensing levels of drive current applied to said drive means, and in which during operation in said position control mode said control apparatus establishes for each of said drive sections a position control loop for controlling drive power applied to said each drive section in accordance with an error between a corresponding position control signal and an output signal from said position sensing means, a velocity control loop for controlling said drive power utilizing an output signal from said velocity sensing means as a feedback signal, and in which during operation in said force control mode said control apparatus establishes, for one of said drive sections which is currently selected to be actuated, a force control loop for controlling drive power applied to said one drive section in accordance with an error between a corresponding force control signal and an output signal from said velocity sensing means, and establishes a current control loop for controlling said drive power utilizing an output signal from said current sensing means as a feedback signal.

2. An industrial robot according to claim 1, in which said position sensing means comprises at least one position encoder coupled to said drive means, and in which detection of halting of said operating member is performed by detection of a cessation of change in count values produced by a position counter which is coupled to receive an output signal produced from said encoder.

3. An industrial robot according to claim 2, in which a count value attained by said position counter at said halting of the operating member is compared with reference position data, to thereby obtain the position of a surface region of said workpiece relative to a reference position.

4. An industrial robot according to claim 1 in which said plurality of directions are mutually perpendicular X, Y and Z directions and in which said arm mechanism comprises a pantograph mechanism formed of four mutually movably linked arms, consisting of a first and third member disposed mutually in parallel and a second and fourth member disposed mutually in parallel, and in which a first pivot provided at one end of said first member, a second pivot provided at one end of said fourth member, and the extremity of a free end of said second member are respectively aligned along a common straight line, with a portion of said free end constituting said operating member.

5. An industrial robot according to claim 4, in which said drive means comprises a first linear motor coupled for moving said first pivot in said Z direction, a second linear motor coupled for moving said first pivot in said Y direction, and a third linear motor coupled for moving said second pivot in said X direction.

* * * * *